(12) United States Patent
Beeftink et al.

(10) Patent No.: US 11,759,029 B2
(45) Date of Patent: Sep. 19, 2023

(54) BABY CARRIAGE AND QUICK RELEASE PILLOW

(71) Applicant: Wonderland Switzerland AG, Steinhausen (CH)

(72) Inventors: Anne Beeftink, Steinhausen (CH); Martijn Hans Van Gelderen, Leiderdorp (NL)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 17/394,435

(22) Filed: Aug. 5, 2021

(65) Prior Publication Data
US 2022/0053948 A1 Feb. 24, 2022

(30) Foreign Application Priority Data

Aug. 7, 2020 (CN) .................. 202010789699.X

(51) Int. Cl.
*A47D 13/08* (2006.01)
*A47G 9/10* (2006.01)
*A47C 7/38* (2006.01)

(52) U.S. Cl.
CPC .............. *A47D 13/08* (2013.01); *A47G 9/10* (2013.01); *A47C 7/383* (2013.01)

(58) Field of Classification Search
CPC ........ A47D 13/08; A47D 13/00; A47D 15/00; A47G 9/10; A47G 9/1045; A47C 7/383; A47C 7/38; A47C 7/736; A47C 7/36
(Continued)

(56) References Cited

U.S. PATENT DOCUMENTS 471,049 A * 3/1892 Barth ................ B60N 2/882
297/401
858,908 A * 7/1907 Rauch ................ A47C 20/027
5/640
(Continued)

FOREIGN PATENT DOCUMENTS

CN 1275796 9/2006
CN 104309507 A 1/2015
(Continued)

OTHER PUBLICATIONS

Drifter Crash Pad 2019—The Hinge Refined—Flashed, Jun. 16, 2021.

*Primary Examiner* — Robert G Santos
(74) *Attorney, Agent, or Firm* — Winston Hsu

(57) ABSTRACT

The invention discloses a quick release pillow including a pillow core, a pillow cover encapsulating the pillow core, and at least one hook connected to the pillow cover. The hook includes a fixing portion and a hook portion connected to each other and spaced apart. The fixing portion is configured to be connected to the pillow cover. The hook portion is configured to be detachably hung on a baby carriage. The invention not only achieves quick assembly and disassembly of the quick release pillow, but also saves time of assembly and disassembly, such that the use of the quick release pillow is more convenient. The invention also discloses a baby carriage with the quick release pillow. A covering layer of the baby carriage has at least one fastener for selectively hanging the quick release pillow, such that the use of the baby carriage is also more convenient and flexible.

16 Claims, 14 Drawing Sheets

(58) Field of Classification Search
USPC .............................. 5/655, 657, 652, 640, 636
See application file for complete search history.

(56) References Cited

U.S. PATENT DOCUMENTS

| | | | | |
|---|---|---|---|---|
| 1,163,945 A * | 12/1915 | Murdock | ............... | A47K 3/125 |
| | | | | 4/575.1 |
| 2,096,423 A * | 10/1937 | Harry | ................ | A45F 3/22 |
| | | | | 5/636 |
| 3,062,586 A * | 11/1962 | Rowland | ............... | B60N 2/882 |
| | | | | 297/230.11 |
| 5,154,477 A * | 10/1992 | Lacy | ................ | A47C 7/383 |
| | | | | 297/DIG. 6 |
| 5,205,611 A * | 4/1993 | Stephens | .............. | A47C 7/383 |
| | | | | 5/636 |
| 6,088,855 A * | 7/2000 | Connolly | ............. | A47D 15/006 |
| | | | | 5/636 |
| 6,116,691 A * | 9/2000 | Reece | ............... | A47D 15/00 |
| | | | | 5/636 |
| 6,139,100 A * | 10/2000 | Baskin-Lockman | ........................ | |
| | | | | B60N 2/2881 |
| | | | | 411/509 |
| 6,266,832 B1 * | 7/2001 | Ezell | ................. | B60N 2/2881 |
| | | | | 5/636 |
| 6,435,617 B1 | 8/2002 | McNair | | |
| 6,484,335 B2 * | 11/2002 | Gilbert | ................. | A47C 7/383 |
| | | | | 5/639 |
| 6,527,339 B2 * | 3/2003 | Voris | ................ | B60N 2/2881 |
| | | | | 297/284.7 |
| 6,938,958 B2 * | 9/2005 | Gold | ................ | A47D 15/006 |
| | | | | 297/400 |
| 7,275,792 B2 * | 10/2007 | Pos | ................. | B60N 2/2872 |
| | | | | 297/250.1 |
| 7,533,933 B2 * | 5/2009 | Pos | ................. | B60N 2/847 |
| | | | | 297/250.1 |
| 8,141,955 B1 * | 3/2012 | Maassarani | ........... | B60N 2/882 |
| | | | | 297/393 |
| 8,469,452 B2 * | 6/2013 | Maassarani | ........... | A47C 7/383 |
| | | | | 297/397 |
| 8,708,416 B2 * | 4/2014 | Stronconi | .............. | A47C 7/383 |
| | | | | 297/397 |
| 8,931,836 B2 * | 1/2015 | Cheng | ................. | B60N 2/888 |
| | | | | 297/216.12 |
| 9,414,691 B2 * | 8/2016 | Blyberg | ............... | A47C 21/026 |
| 9,629,468 B1 * | 4/2017 | McCabe | ............... | A47C 7/383 |
| 10,085,575 B2 * | 10/2018 | Vogel | ............... | A47G 9/1081 |
| 2001/0022457 A1 * | 9/2001 | Voris | ................ | B60N 2/2881 |
| | | | | 297/219.12 |
| 2001/0049844 A1 * | 12/2001 | Gilbert | ................ | A47C 7/425 |
| | | | | 5/636 |
| 2005/0121962 A1 * | 6/2005 | Gold | ................. | A47D 15/006 |
| | | | | 297/399 |
| 2005/0173961 A1 * | 8/2005 | Morphew | ............ | B60N 2/7005 |
| | | | | 297/397 |
| 2006/0033374 A1 * | 2/2006 | Pos | ................. | B60N 2/847 |
| | | | | 297/397 |
| 2008/0018158 A1 * | 1/2008 | Pos | ................. | B60N 2/2851 |
| | | | | 297/397 |
| 2012/0181835 A1 * | 7/2012 | Maassarani | ........... | A47C 7/383 |
| | | | | 297/397 |
| 2013/0062919 A1 * | 3/2013 | Cheng | ................ | B60N 2/888 |
| | | | | 297/250.1 |
| 2013/0119716 A1 * | 5/2013 | Stronconi | .............. | B60N 2/882 |
| | | | | 297/220 |
| 2015/0265062 A1 * | 9/2015 | Blyberg | ............... | F16B 45/00 |
| | | | | 248/118 |
| 2015/0351564 A1 * | 12/2015 | Vogel | ................ | A47G 9/1054 |
| | | | | 5/640 |
| 2022/0053948 A1 * | 2/2022 | Beeftink | .............. | B60N 2/2881 |

FOREIGN PATENT DOCUMENTS

| | | | | |
|---|---|---|---|---|
| CN | 205131000 U | | 4/2016 | |
| CN | 206781579 U | | 12/2017 | |
| CN | 207902217 | | 9/2018 | |
| CN | 114056200 A | * | 2/2022 | ............ A47D 13/08 |
| DE | 693 10 959 T2 | | 1/1998 | |
| DE | 102021120359 A1 | * | 2/2022 | ............ A47D 13/08 |
| EP | 0 465 033 A1 | | 1/1992 | |
| TW | M584755 U | | 10/2019 | |
| WO | WO9117685 A1 | * | 11/1991 | ............... A47G 9/00 |

* cited by examiner

BABY CARRIAGE AND QUICK RELEASE PILLOW

BACKGROUND OF THE INVENTION

1. Field of the Invention

The invention relates to a baby product and, more particularly, to a baby carriage and a quick release pillow.

2. Description of the Prior Art

Baby carriages (e.g. stroller, safety seat, child dinning chair, etc.) have been widely used in families with babies. The safety seat is generally disposed on a vehicle seat to protect babies. The safety seat can reduce impact through the casing when the vehicle is in an emergency braking or accidental collision, and restrain the body of the baby from moving through a restraint device, so as to reduce the probability of the baby being injured in accidents and ensure the safety of the baby in the vehicle.

The conventional safety seat usually comprises a seat body, a backrest and a headrest. The backrest is disposed at a rear side of the seat body to support the back of the baby. The headrest is fixedly disposed above the backrest for the head of the baby to lean on. At the same time, to ensure the safety and comfort of long-term rides for the baby, the seat body, the backrest and the headrest of the safety seat are further covered with an energy-absorbing protect layer and a breathable seat cover. Some safety seats are further equipped with a pillow, a cushion, etc. The pillow or the cushion is usually fixedly connected to the seat cover, thereby causing a user unable to use the safety seat according to babies of different ages, heights and weights. In addition, the assembly and disassembly operations of some detachable pillows or cushions are more complicated, resulting in inconvenient use of the safety seat.

Therefore, it is necessary to provide a safety seat and a quick release pillow with higher convenience and flexibility in use to solve the aforesaid problems.

SUMMARY OF THE INVENTION

An objective of the invention is to provide a quick release pillow with higher convenience and flexibility in use.

Another objective of the invention is to provide a baby carriage with higher convenience and flexibility in use.

To achieve the aforesaid objectives, the invention provides a quick release pillow. The quick release pillow comprises a pillow core, a pillow cover encapsulating the pillow core, and at least one hook connected to the pillow cover. The hook comprises a fixing portion and a hook portion connected to each other and spaced apart. The fixing portion is configured to be connected to the pillow cover. The hook portion is configured to be detachably hung on a baby carriage.

Preferably, an end of the hook portion is connected to the fixing portion, a gap between the hook portion and the fixing portion forms a clamping region, and another end of the hook portion and the fixing portion are spaced apart to form an engaging opening communicating with the clamping region.

Preferably, the fixing portion and the hook portion are planar structures, and the hook portion is disposed within, parallel to, or inclined with respect to a plane where the fixing portion is located.

Preferably, the hook portion comprises a first connecting arm and a second connecting arm inclined with respect to each other, the first connecting arm is connected to the fixing portion, and the second connecting arm and the fixing portion are spaced apart to form the clamping region and the engaging opening.

Preferably, the first connecting arm is connected to any position in a longitudinal direction of the fixing portion, the second connecting arm extends along the longitudinal direction of the fixing portion, and an end of the second connecting arm away from the first connecting arm is longer than, shorter than, or flush with an end of the fixing portion.

Preferably, the second connecting arm is parallel to or inclined with respect to a middle line in a traverse direction of the fixing portion.

Preferably, the hook portion further comprises a third connecting arm, the first connecting arm is connected to the fixing portion through the third connecting arm, and the third connecting arm and the second connecting arm are spaced apart.

Preferably, the third connecting arm is connected to an end in a longitudinal direction of the fixing portion and extends toward the longitudinal direction of the fixing portion.

Preferably, an axial direction of the first connecting arm is located at or inclined with respect to a plane where the fixing portion is located.

Preferably, the fixing portion is a rectangular structure, a square structure, a circular structure or an oval-shaped structure.

Preferably, the fixing portion has a fixing hole configured to be connected to the pillow cover.

Preferably, the quick release pillow further comprises a connecting belt passing through the fixing hole and being fixed to the pillow cover.

Correspondingly, the invention further provides a baby carriage. The baby carriage comprises a carriage body, a covering layer and the aforesaid quick release pillow. The covering layer covers the carriage body. The at least one fastener is connected to the covering layer. The quick release pillow is detachably hung on the fastener by the hook.

Preferably, the fastener is a ring-shaped structure and the fastener is fixed to or integrally formed with the covering layer.

Preferably, the fastener is an elastic structure.

Preferably, the baby carriage has a plurality of pairs of fasteners, each pair of fasteners is arranged apart along a height direction of the carriage body, and each pair of fasteners is spaced apart along a width direction of the carriage body.

Compared to the prior art, the quick release pillow of the invention comprises at least one hook and each hook comprises the fixing portion and the hook portion connected to each other and spaced apart, such that the quick release pillow can be detachably hung on the baby carriage by the hook portion, so as to achieve quick assembly and disassembly of the quick release pillow and then save time of assembly and disassembly. Therefore, the use of the quick release pillow is more convenient. Correspondingly, the covering layer of the baby carriage with the quick release pillow has at least one fastener for selectively hanging the quick release pillow, such that the use of the baby carriage is also more convenient and flexible.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
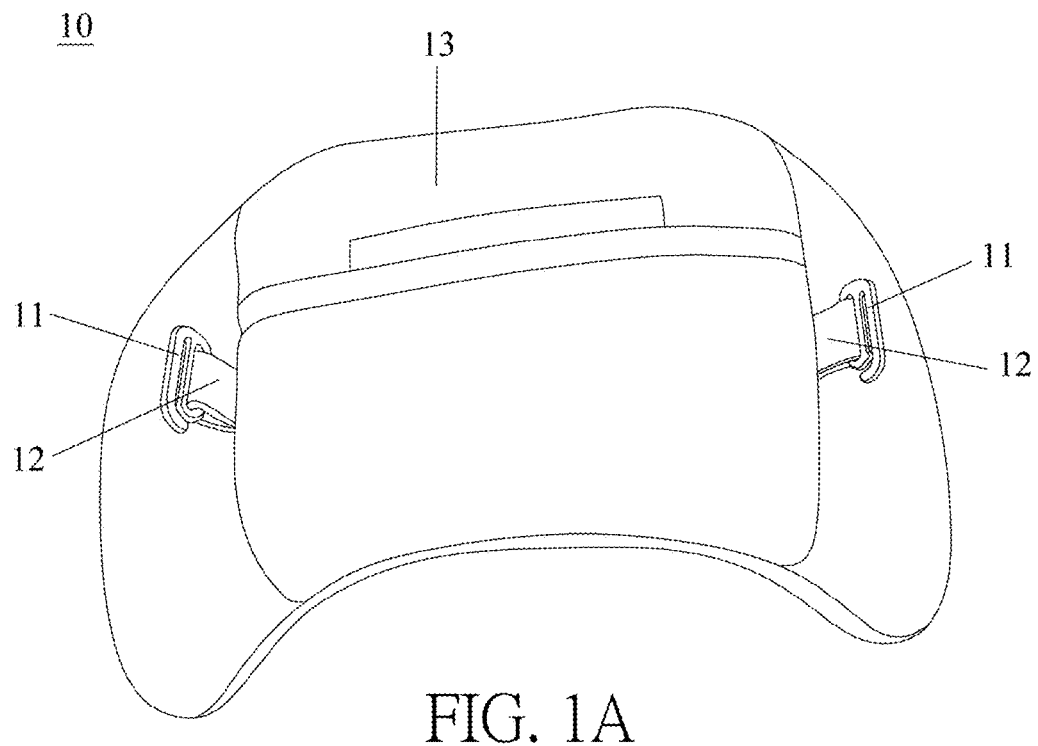
FIG. 1A is a schematic view illustrating the structure of a quick release pillow of the invention.

The embodiments of the invention will now be described with reference to the accompanying drawings, wherein similar numbers in the drawings represent similar elements. A baby carriage recited in the invention may be a safety seat, a stroller, a baby dinning chair, etc. and the invention is not limited to a specific device. In the following, a safety seat is used as a preferred embodiment to depict the connection between the safety seat and a quick release pillow.

As shown in FIGS. 1A to 13, a baby carriage 1 of the invention comprises a quick release pillow 10, a carriage body 20, a covering layer 30 and a fastener 40. The covering layer 30 covers the carriage body 20 and at least one fastener 40 is connected to the covering layer 30. The quick release pillow 10 is detachably connected to the fastener 40.

As shown in FIGS. 9 to 13, in an embodiment, at least one pair of fasteners 40 is connected to the covering layer 30. Each pair of fasteners 40 is arranged apart along a height direction of the carriage body 20, and each pair of fasteners 40 is spaced apart and disposed at an identical horizontal position of the carriage body 20. When the quick release pillow 10 is assembled, the quick release pillow 10 may be selectively hung on one pair of fasteners 40 at an identical horizontal position, so as to make the connection stable and ensure that the quick release pillow 10 is flat after connection to further ensure the comfort during support.

As shown in FIGS. 9 to 13, in a preferred embodiment of the invention, the baby carriage 1 may be a safety seat and the carriage body 20 may be a headrest, wherein the structure and arrangement of the headrest and the covering layer 30 are well known by one skilled in the art, so those will not be depicted in detail herein. The quick release pillow 10 is detachably connected to the covering layer 30 outside the headrest. Accordingly, the shape of the quick release pillow 10 preferably corresponds to the shape of the headrest. For example, in this embodiment, the quick release pillow 10 is bent into an arc structure to fit the headrest to increase the comfort in use. Needless to say, the carriage body 20 may also be other parts of the safety seat. In this case, the quick release pillow 10 may also be connected to corresponding parts for use as needed.

Figure 1B:
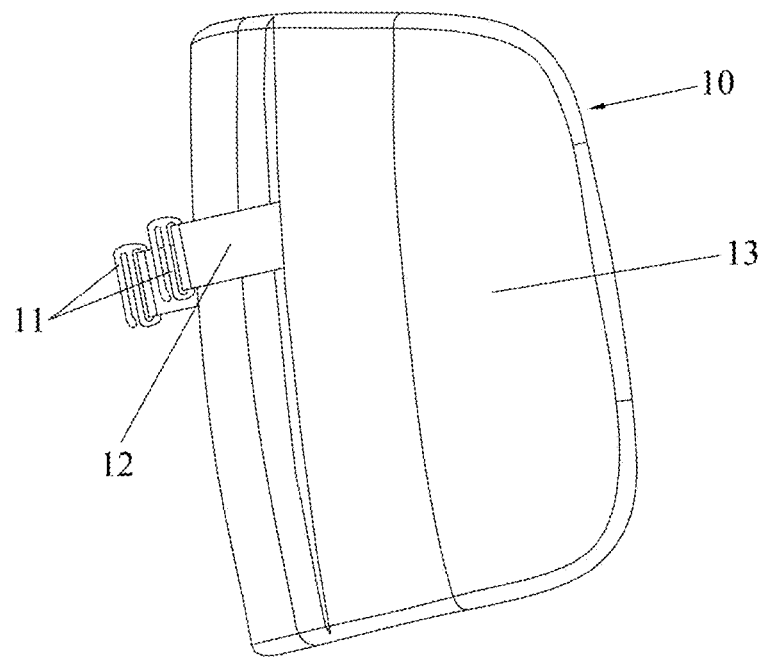
FIG. 1B is a schematic view illustrating the structure of FIG. 1A from another viewing angle.

As shown in FIGS. 1A and 1B, in the invention, the quick release pillow 10 comprises a hook 11, a connecting belt 12, a pillow cover 13 and a pillow core (not shown). The pillow cover 13 encapsulates the pillow core. The hook 11 is connected to the pillow cover 13 by the connecting belt 12 and the quick release pillow 10 has at least one hook 11. The quick release pillow 10 is detachably hung om the fastener 40 by the hook 11 to achieve quick assembly and disassembly. As for the specific shape of the pillow core, it can be the aforesaid arc structure or other shapes and it is not specifically limited herein, as long as it can be adapted to its installation location. The arrangement of the pillow cover 13 is not limited either, as long as it can encapsulate the pillow core.

It can be understood that the hook 11 is not limited to be fixed to the pillow cover 13 by the connecting belt 12. The function of the hook 11 will not be affected even if the hook 11 is directly fixed to the pillow cover 13 or fixed to the pillow cover 13 by other connecting members.

As shown in FIGS. 9 to 13, the fastener 40 of the invention has a fastening hole and the hook 11 can pass through the fastening hole to be hung on the fastener 40. In a preferred embodiment, the fastener 40 is a ring-shaped structure and made of a flexible material such as a webbing, an Oxford belt, etc. The fastener 40 is directly sewn to or integrally formed with the covering layer 30. Needless to say, the fastener 40 is not limited to the aforesaid shape and material.

Preferably, the fastener 40 is an elastic structure. Accordingly, when the hook 11 is hung on the fastener 40, the connection of the hook 11 is more stable due to elastic contraction of the fastener 40.

As shown in FIGS. 1A to 9, in the invention, the hook 11 comprises a fixing portion 111 and a hook portion 112 connected to each other and spaced apart. The fixing portion 111 has a fixing hole 1111 and the fixing hole 1111 is penetrated through the fixing portion 111. The connecting belt 12 passes through the fixing hole 1111 and is fixed to the pillow cover 13. An end of the hook portion 112 is connected to the fixing portion 111 and a gap between the hook portion 112 and the fixing portion 111 forms a clamping region 113. Another end of the hook portion 112 and the fixing portion 111 are spaced apart to form an engaging opening 114 communicating with the clamping region 113. The hook 11 is detachably hung on the aforesaid fastener 40 by the hook portion 112.

In the invention, the fixing portion 111 is preferably a planar structure and the shape of the fixing portion 111 may be rectangular, square, circular, oval-shaped, etc. The invention is not specifically limited. The hook portion 112 may be disposed within, parallel to, or inclined with respect to a plane where the fixing portion 111 is located at. In the following, different embodiments of the invention are depicted along with FIGS. 2A to 8B.

Figure 2A:
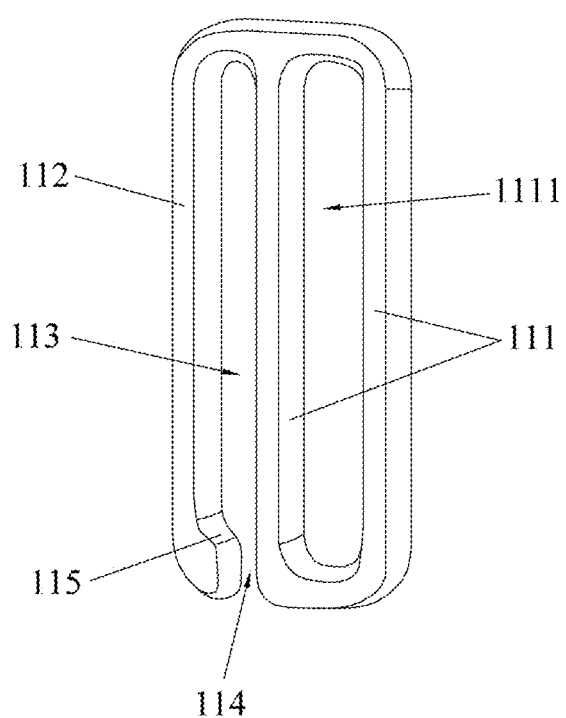
FIGS. 2A to 2C are schematic views illustrating the structure of a hook of a first embodiment of the invention.
Figure 2B:
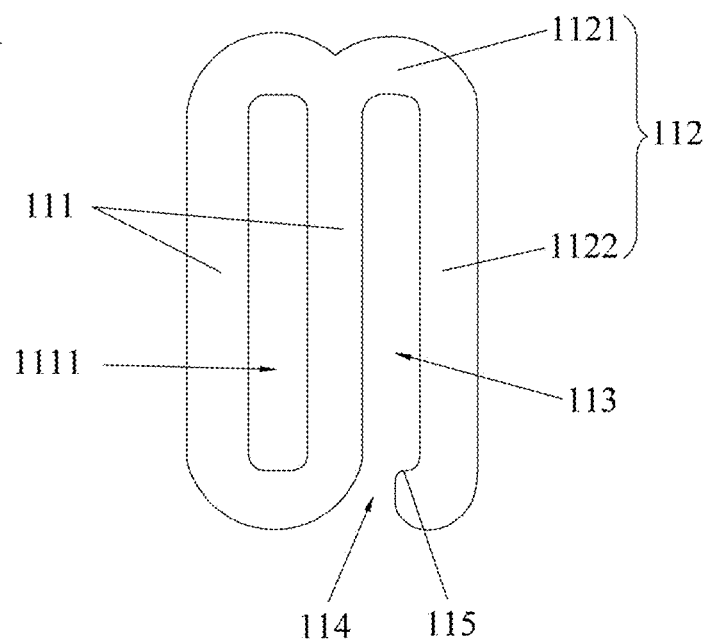
Figure 3:
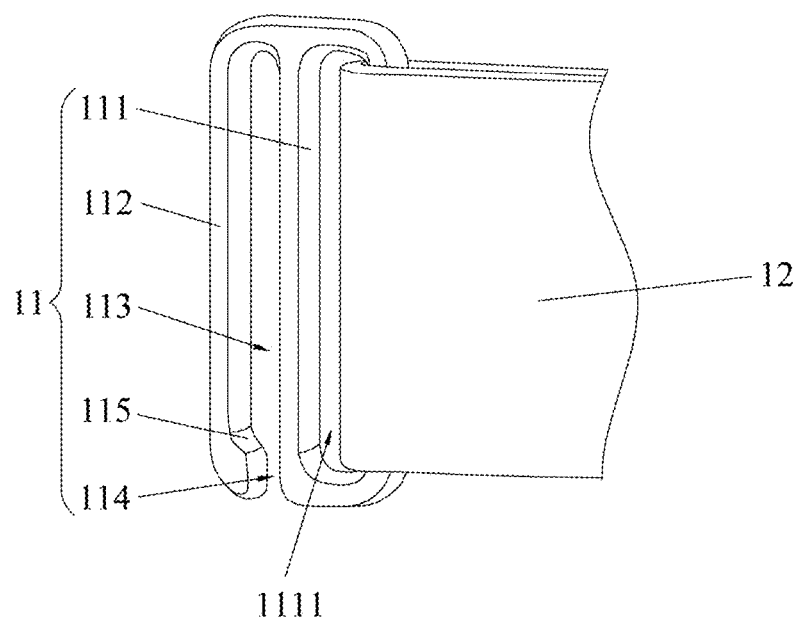
FIG. 3 is a schematic view illustrating the structure of the hook shown in FIG. 2A being connected to a connecting belt.

As shown in FIGS. 2A, 2B and 3, in a first embodiment of the invention, the fixing portion 111 of the hook 11 is a planar structure, the fixing hole 111 penetrates the planar structure, and the shape of the fixing portion 111 is rectangular or oval-shaped. The fixing portion 111 is not limited to the aforesaid shape and planar structure, as long as the fixing hole 1111 can be connected to the connecting belt 12. The hook portion 112 is connected to a side of the fixing portion 111 and the hook portion 112 and the fixing portion 111 are located within an identical plane.

Figure 13:
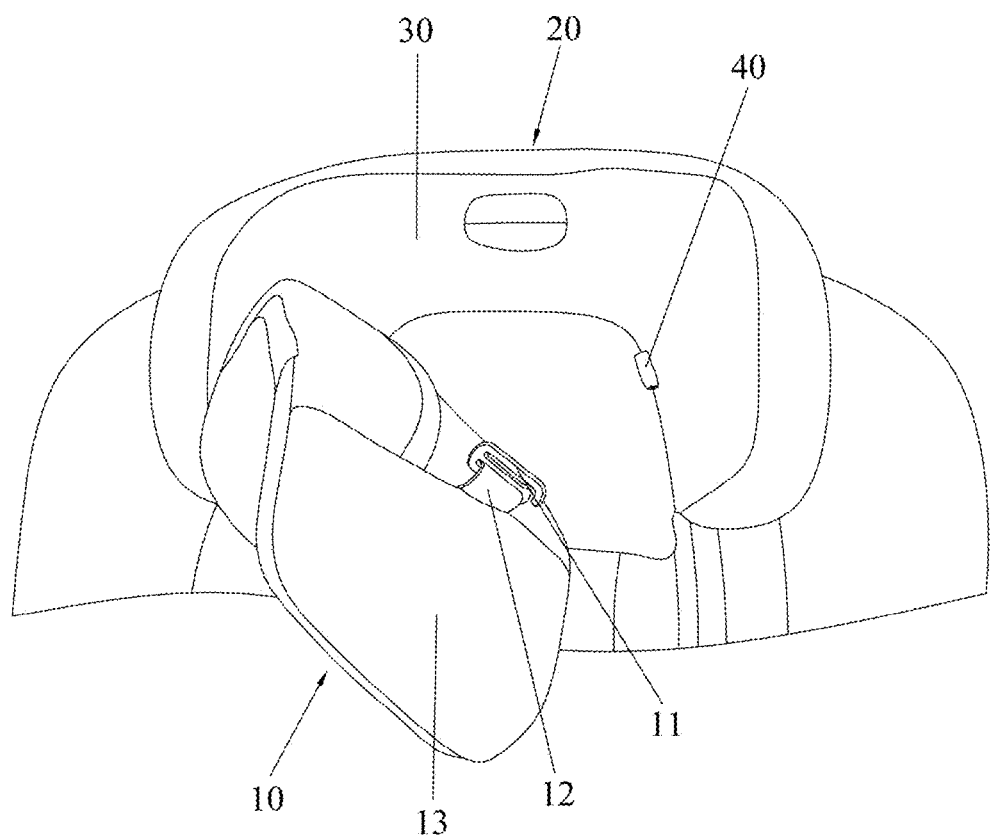
FIG. 13 is a schematic view illustrating the connecting state of the baby carriage and the quick release pillow shown in FIG. 10.

More specifically, the hook portion 112 comprises a first connecting arm 1121 and a second connecting arm 1122 inclined with respect to each other, and the first connecting arm 1121 may be connected to any position in a longitudinal direction of the fixing portion 111. In this embodiment, the first connecting arm 1121 is connected to an end in the longitudinal direction of the fixing portion 111 and extends toward a traverse direction of the fixing portion 111. The second connecting arm 1122 extends along the longitudinal direction of the fixing portion 111 and is spaced apart from the fixing portion 111. The gap between the second connecting arm 1122 and the fixing portion 111 forms the clamping region 113. At the same time, the engaging opening 114 is formed between an end of the second connecting arm 1122 away from the first connecting arm 1121 and the fixing portion 111. The end of the second connecting arm 1122 away from the first connecting arm 1121 may be longer than, shorter than, or flush with an end of the fixing portion 111. In this embodiment, the end of the second connecting arm 1122 away from the first connecting arm 1121 is preferably flush with the end of the fixing portion 111. When the hook 11 is connected to the fastener 40 (as shown in FIG. 13), the engaging opening 114 of the hook 11 is engaged with the fastener 40. After the hook 11 is pressed, the fastener 40 will slide into the clamping region 113 from the engaging opening 114, such that the hook 11 is hung on the fastener 40.

Figure 2C:
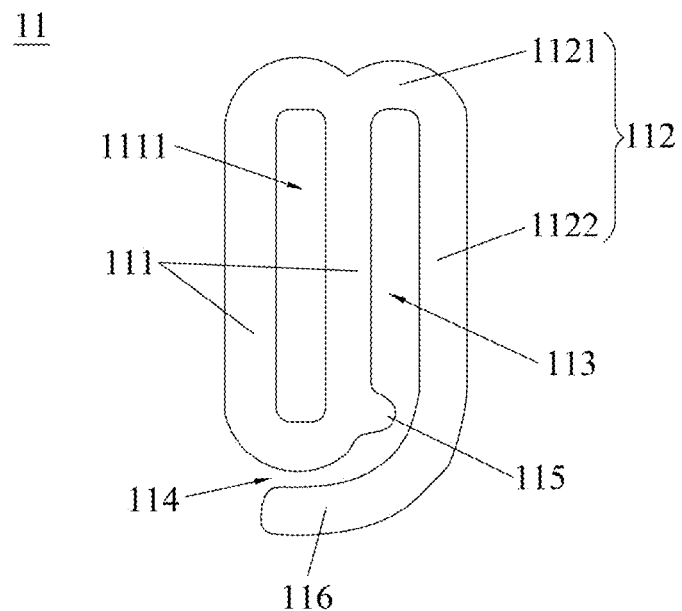

As shown in FIGS. 2A to 2C, in this embodiment, the hook 11 may further comprise a block portion 115. The block portion 115 may be disposed on the second connecting arm 1122 (as shown in FIGS. 2A and 2B) or the fixing portion 111 and extend toward the clamping region 113. The block portion 115 is disposed at a position close to the engaging opening 114 and configured to prevent the fastener 40 from sliding out of the clamping region 113, so as to ensure the stability of the connection of the hook 11.

As shown in FIG. 2C, the hook 11 further comprises a guiding portion 116. The guiding portion 116 is disposed on an end of the second connecting arm 1122 away from the first connecting arm 1121 and surrounds the fixing portion 111. Preferably, the shape of the guiding portion 116 corresponds to the shape of the end of the fixing portion 111 and the guiding portion 116 is parallel to the end of the fixing portion 111. In this embodiment, the block portion 115 is disposed on the fixing portion 111 and extends toward the clamping region 113, and the guiding portion 116 is an arc structure and parallel to the fixing portion 111. The arrangement of the guiding portion 116 enables the fastener 40 to be easily inserted into the clamping region 113 through the guidance of the guiding portion 116. Furthermore, the guiding portion 116 cooperates with the block portion 115 to effectively prevent the fastener 40 from sliding out of the clamping region 113.

Figure 4A:
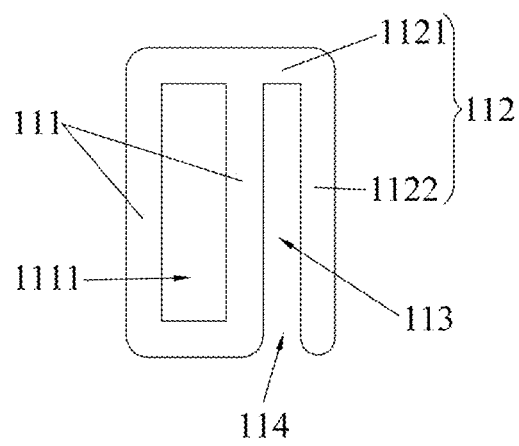
FIGS. 4A to 4D are schematic views illustrating the structure of a hook of a second embodiment of the invention.
Figure 4B:
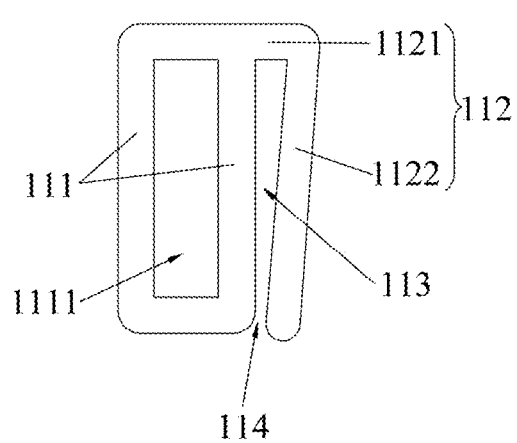
Figure 4C:
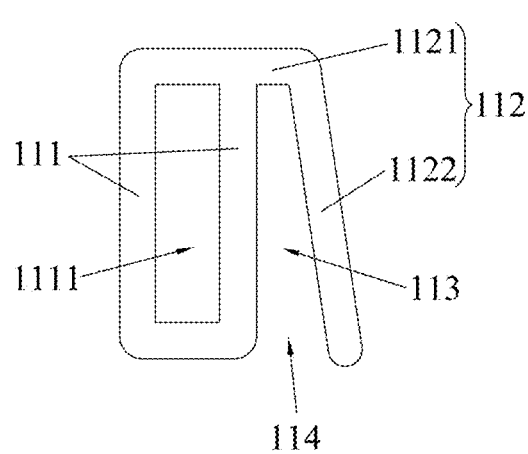
Figure 4D:
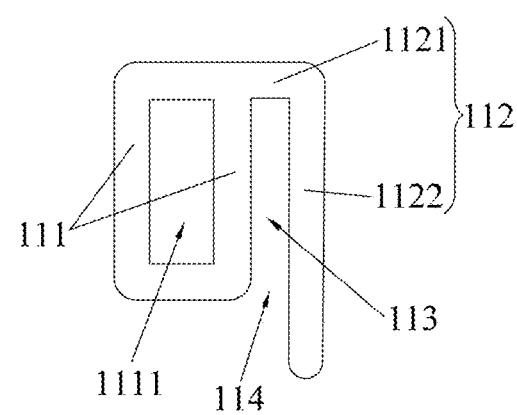

As shown in FIGS. 4A to 4D, in a second embodiment of the invention, the arrangement of the fixing portion 111 of the hook 11 is the same as that in the aforesaid first embodiment, and the description will not be repeated. The hook portion 112 of this embodiment is also connected to a side of the fixing portion 111, and the hook portion 112 and the fixing portion 111 are located within an identical plane. The hook portion 112 also comprises a first connecting arm 1121 and a second connecting arm 1122 inclined with respect to each other. The first connecting arm 1121 is connected to an end in the longitudinal direction of the fixing portion 111 and extends toward a traverse direction of the fixing portion 111. An end of the second connecting arm 1122 is connected to the first connecting arm 1121. The second connecting arm 1122 extends along the longitudinal direction of the fixing portion 111. The gap between the second connecting arm 1122 and the fixing portion 111 forms the clamping region 113. An end of the second connecting arm 1122 away from the first connecting arm 1121 is preferably flush with an end of the fixing portion 111 (as shown in FIGS. 4A to 4C), but may also be longer than the end of the fixing portion 111 (as shown in FIG. 4D) or shorter than the end of the fixing portion 111 (not shown).

In this embodiment, the second connecting arm 1122 may be parallel to a middle line in the traverse direction of the fixing portion 111, such that the width of the engaging opening 114 is equal to the width of the clamping region 113 (as shown in FIG. 4A). The second connecting arm 1122 may also be gradually inclined from the first connecting arm 1121 close to the middle line in the traverse direction of the fixing portion 111, such that the width of the engaging opening 114 is smaller than the width of the clamping region 113 (as shown in FIG. 4B). The second connecting arm 1122 may also be gradually inclined from the first connecting arm 1121 away from the middle line in the traverse direction of the fixing portion 111, such that the width of the engaging opening 114 is larger than the width of the clamping region 113 (as shown in FIG. 4C).

It should be noted that other parts of the hook 11 that are not depicted in this embodiment may be the structure in any of the aforesaid embodiments.

Figure 5A:
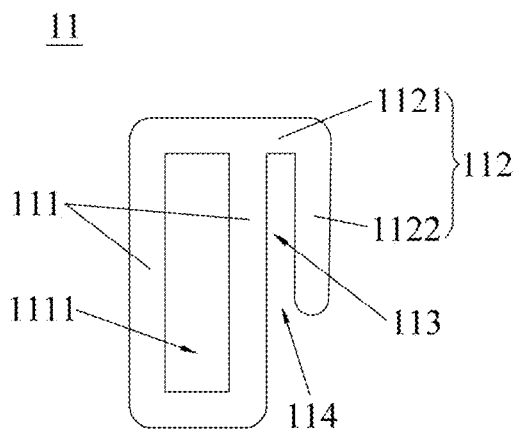
FIGS. 5A to 5C are schematic views illustrating the structure of a hook of a third embodiment of the invention.
Figure 5B:
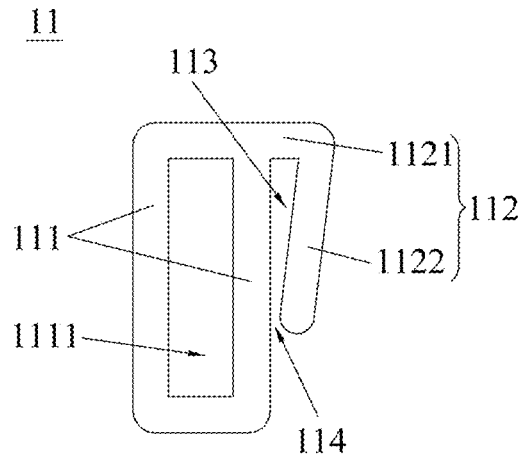
Figure 5C:
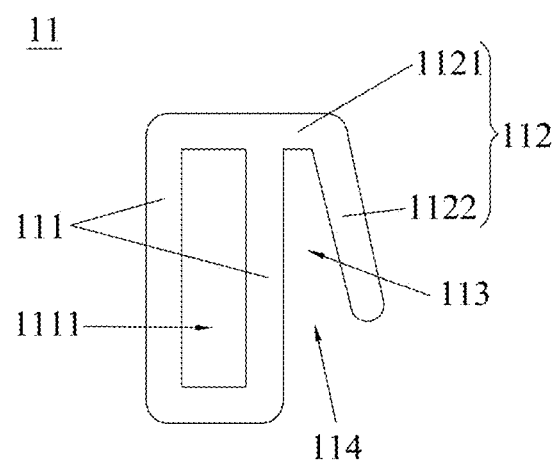

As shown in FIGS. 5A to 5C, in a third embodiment of the invention, the main difference between the hook 11 and the aforesaid second embodiment is that the length of the second connecting arm 1122 is different, and the other parts are the same. In this embodiment, the end of the second connecting arm 1122 away from the first connecting arm 1121 is shorter than the end in the longitudinal direction of the fixing portion 111 and specifically extends to approximately the middle in the longitudinal direction of the fixing portion 111.

Figure 6A:
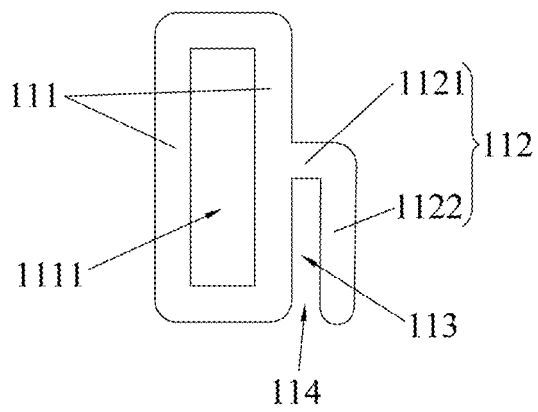
FIGS. 6A to 6C are schematic views illustrating the structure of a hook of a fourth embodiment of the invention.
Figure 6B:
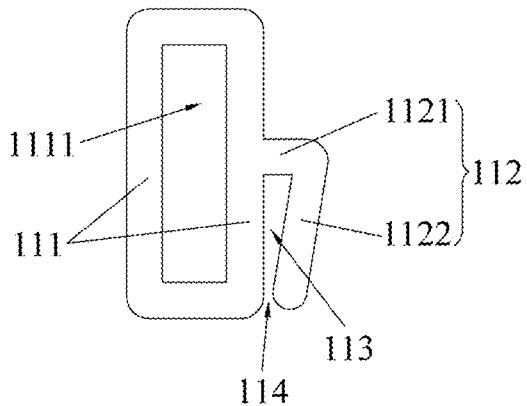
Figure 6C:
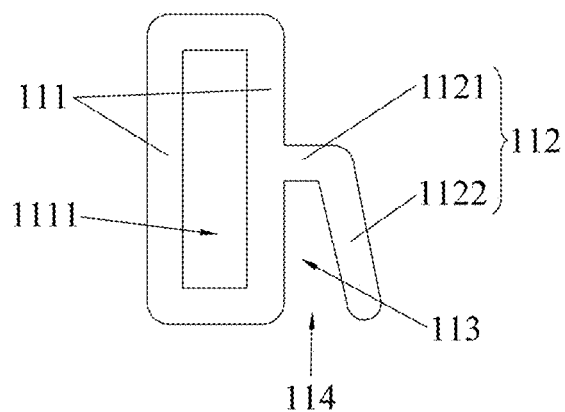

As shown in FIGS. 6A to 6C, in a fourth embodiment of the invention, the length of the second connecting arm 1122 is also shorter than the end in the longitudinal direction of the fixing portion 111, but the arrangement is slightly different from the aforesaid third embodiment.

In this embodiment, the first connecting arm 1121 is connected to approximately the middle in the longitudinal direction of the fixing portion 111 and extends toward the traverse direction of the fixing portion 111. An end of the second connecting arm 1122 is connected to the first connecting arm 1121. Another end of the second connecting arm 1122 extends toward the longitudinal direction of the fixing portion 111 and is substantially flush with the end of the fixing portion 111. At the same time, the second connecting arm 1122 may be parallel to a middle line in the traverse direction of the fixing portion 111 (as shown in FIG. 6A). The second connecting arm 1122 may also be gradually inclined from the first connecting arm 1121 close to the middle line in the traverse direction of the fixing portion 111 (as shown in FIG. 6B). The second connecting arm 1122 may also be gradually inclined from the first connecting arm 1121 away from the middle line in the traverse direction of the fixing portion 111 (as shown in FIG. 6C).

Figure 7A:
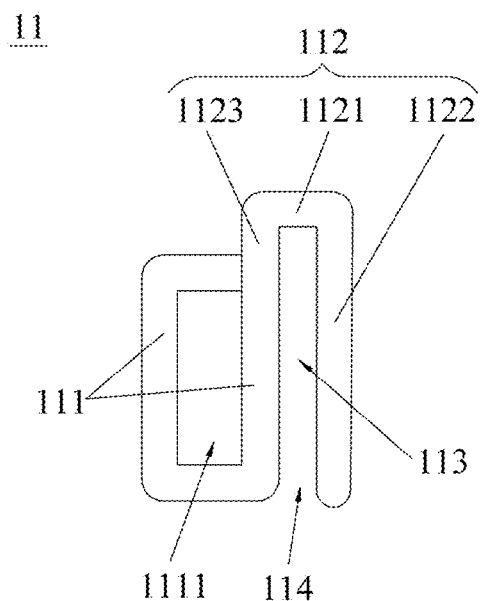
FIGS. 7A and 7B are schematic views illustrating the structure of a hook of a fifth embodiment of the invention.
Figure 7B:
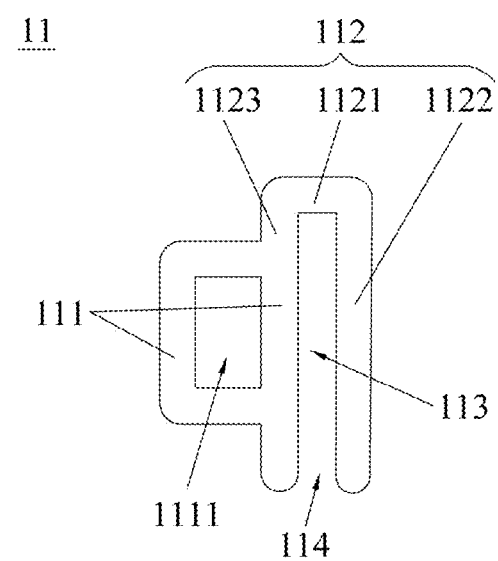

As shown in FIGS. 7A and 7B, in a fifth embodiment of the invention, the arrangement of the hook portion 112 is slightly different from the aforesaid embodiments. Specifically, the hook portion 112 further comprises a third connecting arm 1123. The third connecting arm 1123 and the second connecting arm 1122 are respectively connected to two ends of the first connecting arm 1121 and parallel to each other. Another end of the third connecting arm 1123 is connected to an end in the longitudinal direction of the fixing portion 111 and the third connecting arm 1123 extends along the longitudinal direction of the fixing portion 111. The second connecting arm 1122 extends along the longitudinal direction of the fixing portion 111 and the end of the second connecting arm 1122 away from the first connecting arm 1121 may be flush with the end of the fixing portion 111 (as shown in FIG. 7A). Needless to say, the end of the second connecting arm 1122 away from the first connecting arm 1121 may also be longer than the end of the fixing portion 111 (as shown in FIG. 7B) or shorter than the end of the fixing portion 111.

Furthermore, in this embodiment, the second connecting arm 1122 is preferably parallel to a middle line in the traverse direction of the fixing portion 111 (as shown in FIGS. 7A and 7B), but the invention is not so limited. The second connecting arm 1122 may also be gradually inclined from the first connecting arm 1121 close to or away from the middle line in the traverse direction of the fixing portion 111.

Figure 8A:
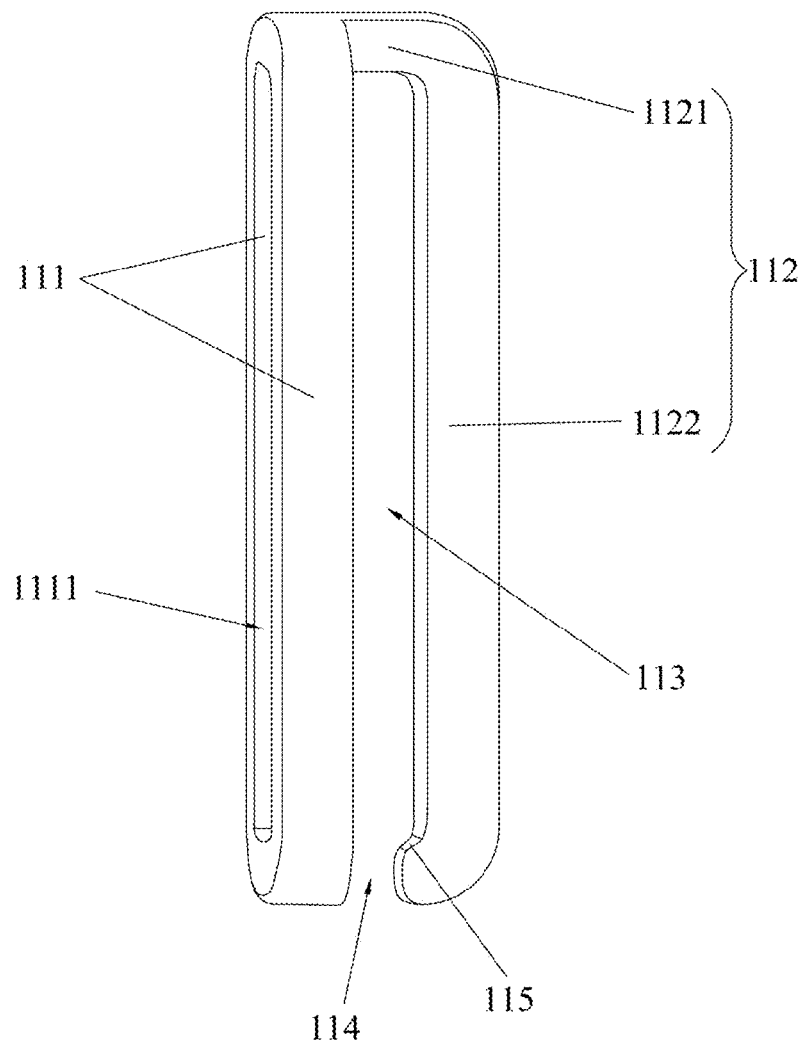
FIG. 8A is a schematic view illustrating the structure of a hook of a sixth embodiment of the invention.
Figure 8B:
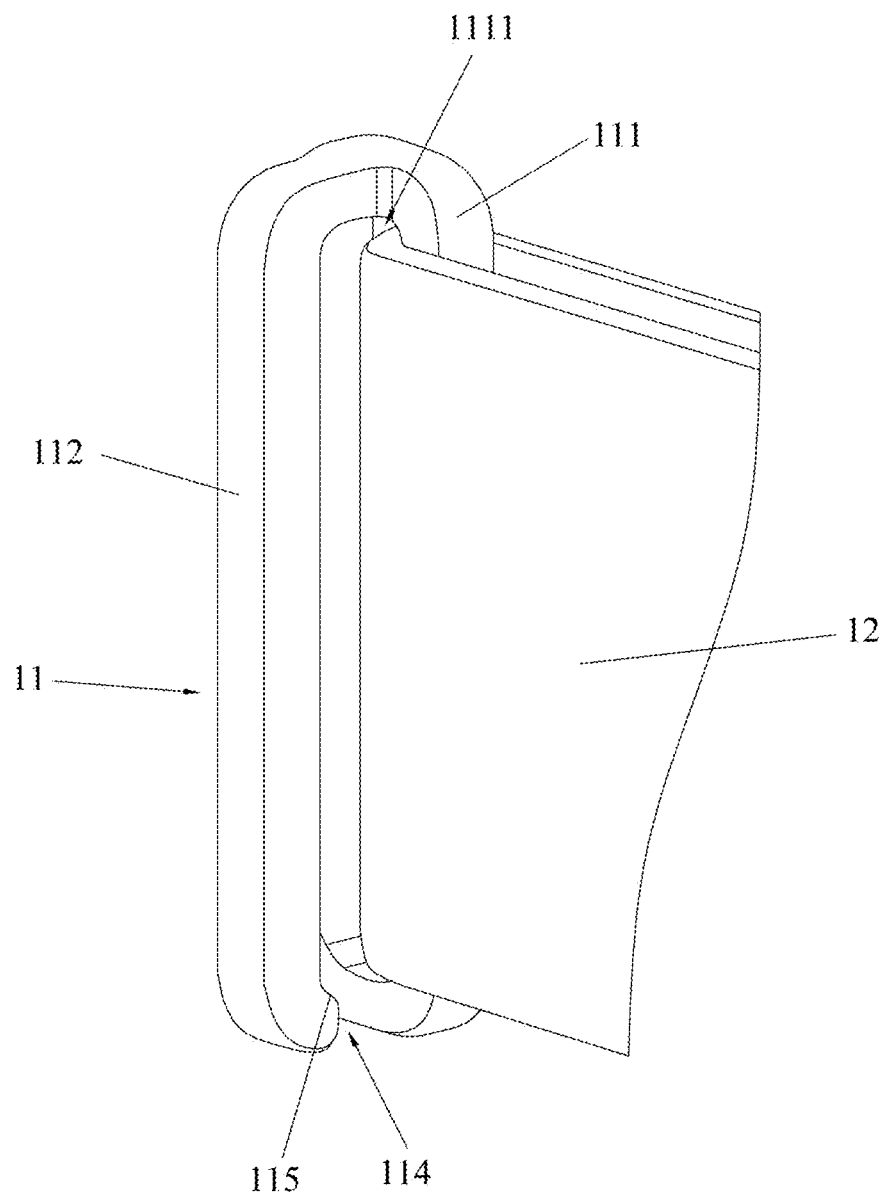
FIG. 8B is a schematic view illustrating the structure of the hook shown in FIG. 8A being connected to a connecting belt.
Figure 9:
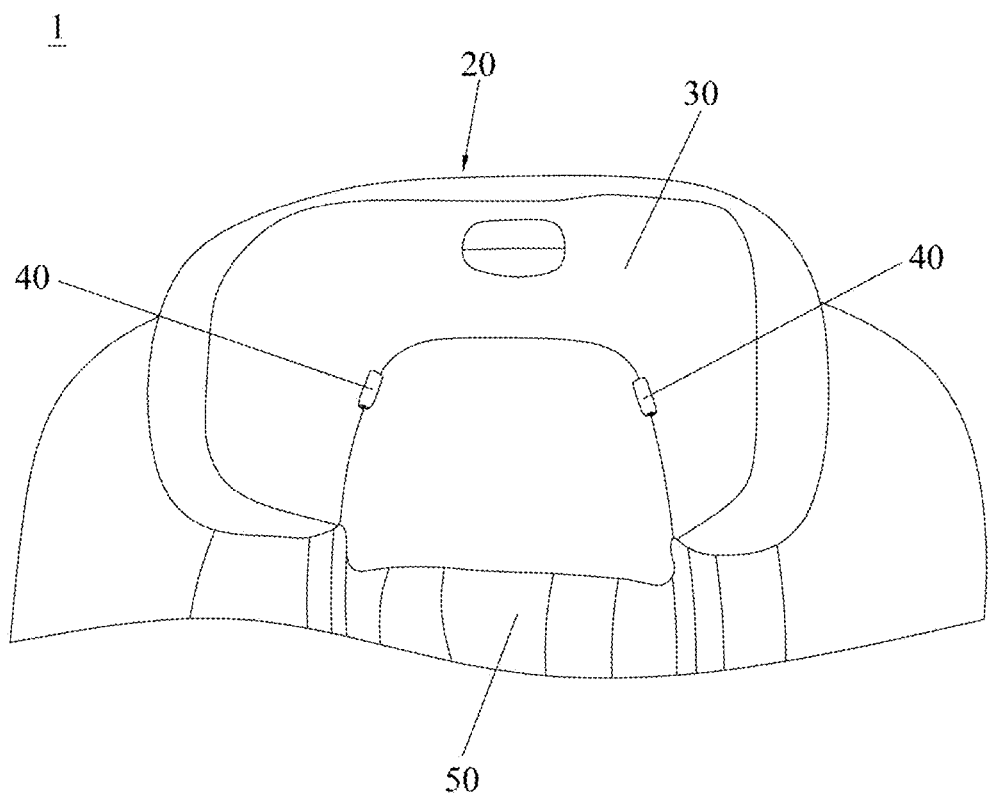
FIG. 9 is a schematic view illustrating partial structure of a baby carriage of the invention.

As shown in FIGS. 8A and 8B, in a sixth embodiment of the invention, the main difference between this embodiment and the aforesaid embodiments is that the fixing portion 111 and the hook portion 112 are not disposed within an identical plane. The fixing portion 111 may be the arrangement in any of the aforesaid embodiments and the plane where the hook portion 112 is located at is preferably perpendicular to the plane where the fixing portion 111 is located at. Needless to say, the fixing portion 111 and the hook portion 112 may also be inclined with respect to each other by any angle.

Specifically, the hook portion 112 comprises a first connecting arm 1121 and a second connecting arm 1122 inclined with respect to each other, the first connecting arm 1121 is connected to an end in the longitudinal direction of the fixing portion 111, and the first connecting arm 1121 is perpendicular to the plane where the fixing portion 111 is locate at. An end of the second connecting arm 1122 is connected to the first connecting arm 1121 and extends along the longitudinal direction of the fixing portion 111. The second connecting arm 1122 and the first connecting arm 1121 are spaced apart to form the clamping region 113. The engaging opening 114 is formed between an end of the second connecting arm 1122 away from the first connecting arm 1121 and the fixing portion 111. Furthermore, the second connecting arm 1122 is preferably parallel to the plane where the fixing portion 111 is located at. An end of the second connecting arm 1122 away from the first connecting arm 1121 is substantially flush with the end of the fixing portion 111, but the invention is not so limited. The end of the second connecting arm 1122 away from the first connecting arm 1121 may also be longer or shorter than the end of the fixing portion 111. At the same time, the second connecting arm 1122 may also be gradually inclined from the first connecting arm 1121 close to or away from the plane where the fixing portion 111 is located at.

The other parts of the hook 11 that are not depicted in detail in this embodiment may be the structure in any of the aforesaid embodiments.

As shown in FIGS. 1, 2 and 9 to 13, the quick release pillow 10 is adapted to a safety seat as an example to depict the assembly and disassembly of the quick release pillow 10. A pair of fasteners 40 is spaced apart on the covering layer 30 outside the headrest of the safety seat. Correspondingly, two hooks 11 are spaced apart and connected to the quick release pillow 10. The distance between the two hooks 11 corresponds to the distance between the fasteners 40.

When the quick release pillow 10 needs to be used, each hook 11 of the quick release pillow 10 is hung on a fastener 40. Specifically, the engaging opening 114 of the hook 11 is engaged with the fastener 40 and the hook 11 is pressed downward along a direction indicated by an arrow shown in FIGS. 10 to 12, such that the hook 11 is slidably engaged with the fastener 40. That is to say, the fastener 40 is engaged in the clamping region 113 of the hook 11. At this time, the quick release pillow 10 is disposed on the headrest, as shown in FIG. 13.

Figure 10:
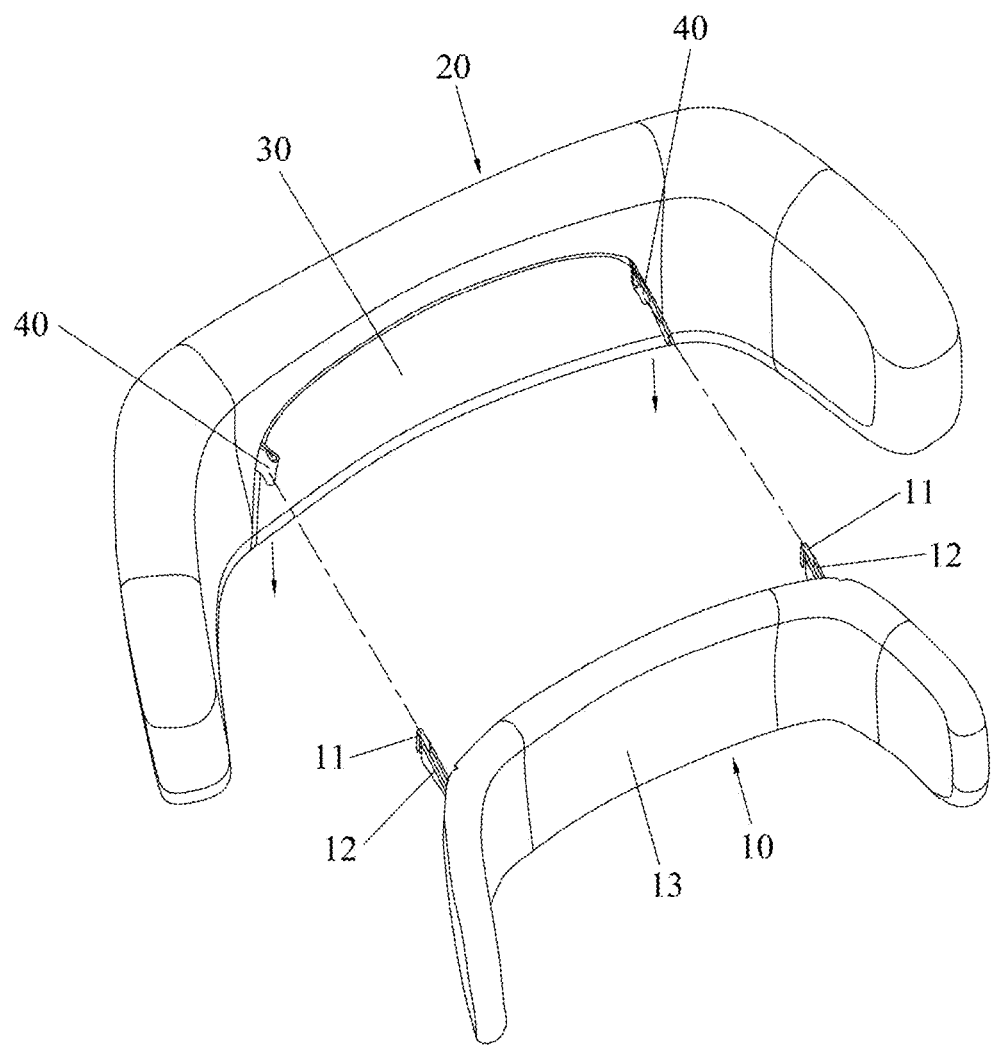
FIG. 10 is a schematic view illustrating the connecting state of a baby carriage and a quick release pillow of the invention.
Figure 11:
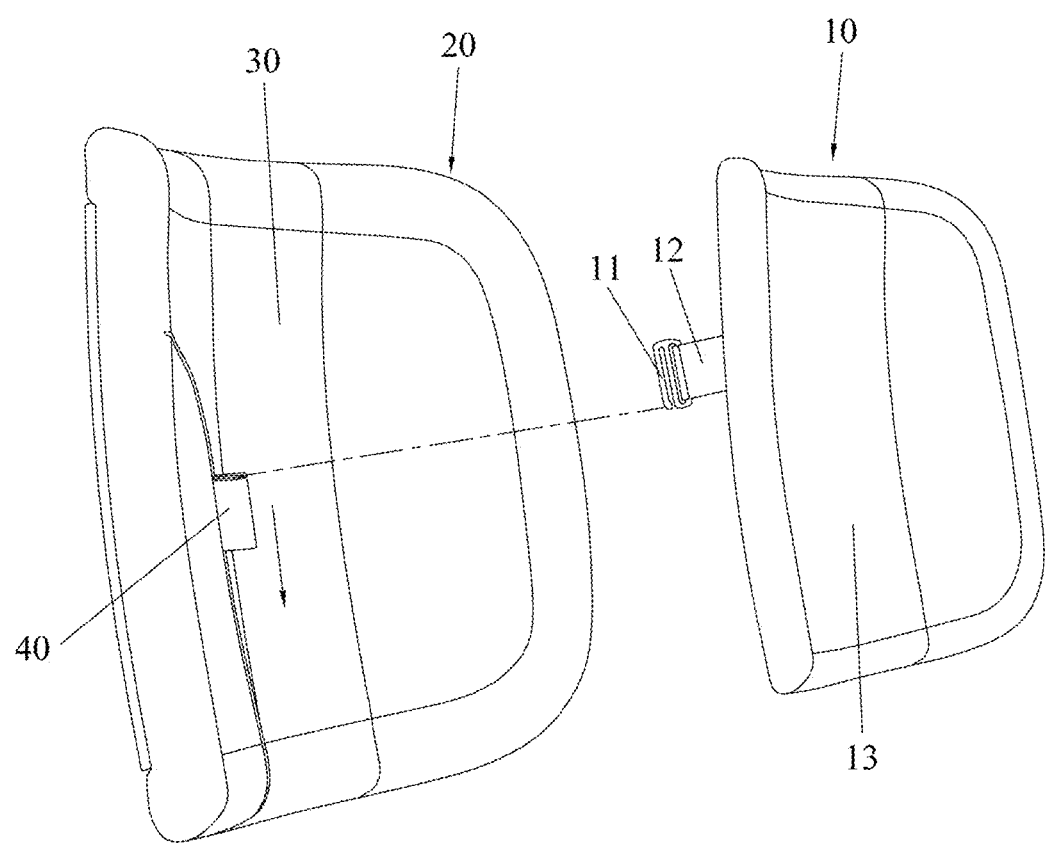
FIG. 11 is a schematic view illustrating the structure of FIG. 10 from another viewing angle.
Figure 12:
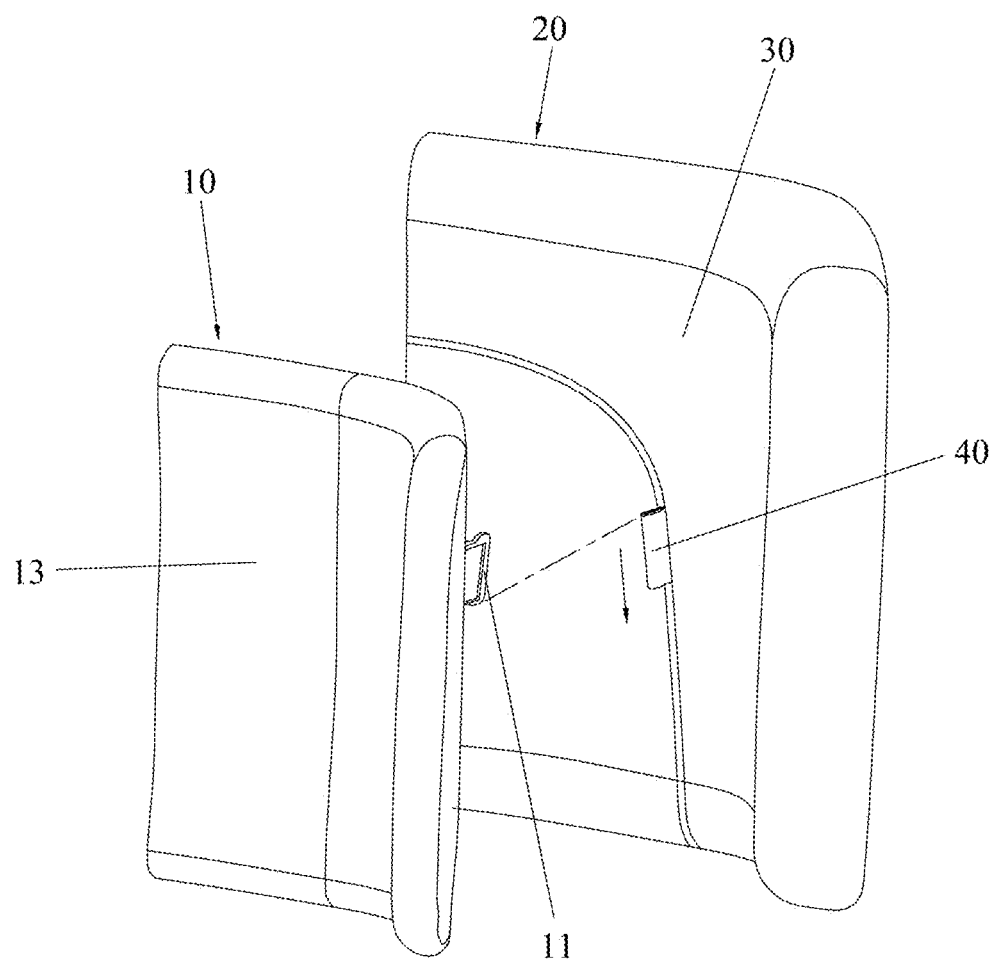
FIG. 12 is a schematic view illustrating the structure of FIG. 10 from another viewing angle.

When the quick release pillow 10 is not needed, a user may pull the hook 11 in the opposite direction of the arrow shown in FIGS. 10 to 12 to disengage the fastener 40, so as to detach the quick release pillow 10.

As mentioned in the above, the quick release pillow 10 of the invention comprises at least one hook 11 and each hook 11 comprises the fixing portion 111 and the hook portion 112 connected to each other and spaced apart, such that the quick release pillow 10 can be detachably hung on the baby carriage 1 by the hook portion 112, so as to achieve quick assembly and disassembly of the quick release pillow 10 and then save time of assembly and disassembly. Therefore, the use of the quick release pillow 10 is more convenient. Correspondingly, the covering layer 30 of the baby carriage 1 with the quick release pillow 10 has at least one fastener 40 for detachably connecting the quick release pillow 10, such that the use of the baby carriage 1 is also more convenient and flexible.

The baby carriage 1 of the invention is a conventional structure well known by one skilled in the art, so it will not be depicted in detail herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A quick release pillow comprising a pillow core, a pillow cover encapsulating the pillow core, and at least one hook connected to the pillow cover, the at least one hook comprising a fixing portion and a hook portion connected to each other and spaced apart, the fixing portion being configured to be connected to the pillow cover, the hook portion being configured to be detachably hung on a baby carriage, wherein an end of the hook portion is connected to the fixing portion, a gap between the hook portion and the fixing portion forms a clamping region, and another end of the hook portion and the fixing portion are spaced apart to form an engaging opening communicating with the clamping region, and wherein, when the hook portion is hung on the baby carriage, at least one fastener of the baby carriage is engaged in the clamping region of the at least one hook.

2. The quick release pillow of claim 1, wherein the fixing portion and the hook portion are planar structures, and the hook portion is disposed within, parallel to, or inclined with respect to a plane where the fixing portion is located.

3. The quick release pillow of claim 2, wherein the fixing portion is a rectangular structure, a square structure, a circular structure or an oval-shaped structure.

4. The quick release pillow of claim 3, wherein the fixing portion has a fixing hole configured to be connected to the pillow cover.

5. The quick release pillow of claim 4, further comprising a connecting belt passing through the fixing hole and being fixed to the pillow cover.

6. The quick release pillow of claim 1, wherein the hook portion comprises a first connecting arm and a second connecting arm inclined with respect to each other, the first connecting arm is connected to the fixing portion, and the second connecting arm and the fixing portion are spaced apart to form the clamping region and the engaging opening.

7. The quick release pillow of claim 6, wherein the first connecting arm is connected to any position in a longitudinal direction of the fixing portion, the second connecting arm extends along the longitudinal direction of the fixing portion, and an end of the second connecting arm away from the first connecting arm is longer than, shorter than, or flush with an end of the fixing portion.

8. The quick release pillow of claim 7, wherein the second connecting arm is parallel to or inclined with respect to a middle line in a traverse direction of the fixing portion.

9. The quick release pillow of claim 6, wherein the hook portion further comprises a third connecting arm, the first connecting arm is connected to the fixing portion through the third connecting arm, and the third connecting arm and the second connecting arm are spaced apart.

10. The quick release pillow of claim 9, wherein the third connecting arm is connected to an end in a longitudinal direction of the fixing portion and extends toward the longitudinal direction of the fixing portion.

11. The quick release pillow of claim 6, wherein an axial direction of the first connecting arm is located at or inclined with respect to a plane where the fixing portion is located.

12. A baby carriage comprising:
a carriage body;
a covering layer covering the carriage body;
the at least one fastener connected to the covering layer; and
the quick release pillow of claim 1 detachably hung on the at least one fastener by the at least one hook.

13. The baby carriage of claim 12, wherein the at least one fastener is a ring-shaped structure and the at least one fastener is fixed to or integrally formed with the covering layer.

14. The baby carriage of claim 12, wherein the at least one fastener is an elastic structure.

15. The baby carriage of claim 12, wherein the baby carriage has a plurality of pairs of fasteners, each pair of fasteners is arranged apart along a height direction of the carriage body, and each pair of fasteners is spaced apart along a width direction of the carriage body.

16. A quick release pillow comprising a pillow core, a pillow cover encapsulating the pillow core, and at least one hook connected to the pillow cover, the at least one hook comprising a fixing portion and a hook portion connected to each other and spaced apart, the fixing portion having a fixing hole configured to be connected to the pillow cover, the hook portion being configured to be detachably hung on a baby carriage.

* * * * *